United States Patent
Haynes et al.

(10) Patent No.: US 10,683,095 B2
(45) Date of Patent: Jun. 16, 2020

(54) COLLAPSIBLE ASPIRATOR BARREL

(71) Applicant: GOODRICH CORPORATION, Charlotte, NC (US)

(72) Inventors: Timothy C. Haynes, Prescott Valley, AZ (US); Daniel Bahena, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 335 days.

(21) Appl. No.: 15/368,172

(22) Filed: Dec. 2, 2016

(65) Prior Publication Data

US 2018/0155039 A1 Jun. 7, 2018

(51) Int. Cl.
| | | |
|---|---|---|
| *B64D 25/14* | (2006.01) | |
| *B64D 25/18* | (2006.01) | |
| *F04F 5/46* | (2006.01) | |
| *F04F 5/20* | (2006.01) | |

(52) U.S. Cl.
CPC ............ *B64D 25/14* (2013.01); *B64D 25/18* (2013.01); *F04F 5/20* (2013.01); *F04F 5/461* (2013.01); *F04F 5/466* (2013.01)

(58) Field of Classification Search
CPC .. B64D 25/14; B64D 25/18; F04F 5/20; F04F 5/461; F04F 5/466
See application file for complete search history.

(56) References Cited

U.S. PATENT DOCUMENTS

| | | | | |
|---|---|---|---|---|
| 3,460,746 A | * | 8/1969 | Forsythe ................. | F04F 5/461 |
| | | | | 417/174 |
| 3,468,472 A | * | 9/1969 | Hahn ...................... | F04F 5/466 |
| | | | | 417/191 |
| 3,598,504 A | * | 8/1971 | Siravo ...................... | F04F 5/48 |
| | | | | 417/184 |
| 3,684,404 A | | 8/1972 | Galbraith | |
| 3,791,764 A | * | 2/1974 | Summer ................... | F04F 5/18 |
| | | | | 138/45 |

(Continued)

FOREIGN PATENT DOCUMENTS

| | | |
|---|---|---|
| EP | 0046275 | 2/1982 |
| WO | 8302981 | 9/1983 |

OTHER PUBLICATIONS

European Patent Office, European Search Report dated Apr. 26, 2018 in application No. 17205269.8-1004.

*Primary Examiner* — Philip J Bonzell
(74) *Attorney, Agent, or Firm* — Snell & Wilmer LLP (57) ABSTRACT

An aspirator includes an aspirator body having at least one flapper door designed to allow intake of a gas from an environment of the aspirator. The aspirator also includes an aspirator barrel having an end tip, a compressible spring, and a fabric positioned about the compressible spring, and designed to extend in response to receiving the gas and to transfer the gas from the aspirator body to the inflatable flotation device. The aspirator also includes a gas valve designed to receive a fluid from a compressed fluid source. The aspirator also includes a nozzle positioned within the aspirator body, coupled to the gas valve, and designed to receive the fluid via the gas valve and to direct at least a portion of the fluid towards the aspirator barrel such that the at least one flapper door allows the gas to flow from the environment into the aspirator barrel.

17 Claims, 6 Drawing Sheets

(56) References Cited

U.S. PATENT DOCUMENTS

| | | | |
|---|---|---|---|
| 4,368,009 A * | 1/1983 | Heimovics, Jr. | B61B 12/005 |
| | | | 417/179 |
| 4,460,343 A | 7/1984 | Heimovics, Jr. et al. | |
| 4,566,862 A * | 1/1986 | Halavais | F04F 5/48 |
| | | | 417/174 |
| 5,002,465 A | 3/1991 | Lagen et al. | |
| 6,071,084 A | 6/2000 | Wass et al. | |
| 8,066,493 B2 | 11/2011 | Renz et al. | |
| 9,863,442 B2 * | 1/2018 | Ruegsegger | F04F 5/48 |
| 2010/0266424 A1 | 10/2010 | Renz | |
| 2014/0072261 A1 * | 3/2014 | Isenhour | G02B 6/32 |
| | | | 385/33 |
| 2016/0102682 A1 | 4/2016 | Gass | |
| 2017/0016459 A1 * | 1/2017 | Ruegsegger | F04F 5/48 |
| 2017/0297726 A1 * | 10/2017 | Volny | B64D 25/14 |
| 2018/0087537 A1 * | 3/2018 | Ruegsegger | F04F 5/46 |

\* cited by examiner

COLLAPSIBLE ASPIRATOR BARREL

FIELD

The present disclosure is directed to evacuation systems for use in aircraft and, more particularly, to aspirators designed to provide air for inflating evacuation devices.

BACKGROUND

Inflatable evacuation devices, such as aircraft evacuation slides and emergency life rafts, typically include a compressed fluid source (such as a charged gas cylinder) and an aspirator. The aspirator, working with the charged gas cylinder, combines gas from the atmosphere and the fluid to provide gas for inflating the emergency evacuation devices. Aspirators are typically stored in a limited packing space and, thus, the evacuation device package is often densely packed. The process of packing the emergency evacuation devices may be relatively difficult due to the limited packing space.

SUMMARY

Described herein is an aspirator for inflating an inflatable flotation device. The aspirator includes an aspirator body having at least one flapper door designed to allow intake of a gas from an environment of the aspirator. The aspirator also includes an aspirator barrel coupled to the aspirator body and the inflatable flotation device, having an end tip, a compressible spring, and a fabric positioned about the compressible spring, and designed to extend in response to receiving the gas and to transfer the gas from the aspirator body to the inflatable flotation device. The aspirator also includes a gas valve coupled to the aspirator body and designed to receive a fluid from a compressed fluid source. The aspirator also includes a nozzle positioned within the aspirator body, coupled to the gas valve, and designed to receive the fluid via the gas valve and to direct at least a portion of the fluid towards the aspirator barrel such that the at least one flapper door allows the gas to flow from the environment into the aspirator barrel.

In any of the foregoing embodiments, the end tip of the aspirator barrel has a glass coating to reduce friction between the end tip and the inflatable flotation device during extension of the aspirator barrel.

Any of the foregoing embodiments may include a cap designed to be disposed on the end tip of the aspirator barrel, to prevent at least one of the gas or the fluid from flowing into the inflatable flotation device during at least a portion of extension of the aspirator barrel within the inflatable flotation device, and to allow at least one of the gas or the fluid to flow into the inflatable flotation device response to pressure within the aspirator barrel reaching a predetermined pressure.

In any of the foregoing embodiments, the cap includes a burst disk designed to rupture in response to the pressure within the aspirator barrel reaching the predetermined pressure.

In any of the foregoing embodiments, the cap includes a snap-fit feature designed to release from the end tip in response to the pressure within the aspirator barrel reaching the predetermined pressure.

Any of the foregoing embodiments may also include an adhesive attaching the cap to the end tip and designed to allow the cap to detach from the end tip in response to the pressure within the aspirator barrel reaching the predetermined pressure.

In any of the foregoing embodiments, the predetermined pressure is selected such that the aspirator barrel is in a fully extended position in response to the pressure within the aspirator barrel being the predetermined pressure.

In any of the foregoing embodiments, the aspirator is configured to be used with an evacuation system of an aircraft.

In any of the foregoing embodiments, the compressible spring of the aspirator barrel includes at least one of aluminum, an aluminum alloy, or steel and the fabric of the aspirator barrel includes at least one of a neoprene, a urethane, an aramid fiber, or a para-aramid fiber.

Also described is an evacuation system for use with an aircraft. The evacuation system includes an inflatable flotation device designed to float in response to being inflated. The evacuation system also includes a compressed fluid source designed to store a fluid in a compressed state. The evacuation system also includes an aspirator. The aspirator includes an aspirator body having at least one flapper door designed to allow intake of a gas from an environment of the aspirator. The aspirator also includes an aspirator barrel coupled to the aspirator body and the inflatable flotation device, having an end tip, a compressible spring, and a fabric positioned about the compressible spring, and designed to extend in response to receiving the gas and to transfer the gas from the aspirator body to the inflatable flotation device. The aspirator also includes a gas valve coupled to the aspirator body and designed to receive the fluid from the compressed fluid source. The aspirator also includes a nozzle positioned within the aspirator body, coupled to the gas valve, and designed to receive the fluid via the gas valve and to direct at least a portion of the fluid towards the aspirator barrel such that the at least one flapper door allows the gas to flow from the environment into the aspirator barrel.

In any of the foregoing embodiments, the end tip of the aspirator barrel has a glass coating to reduce friction between the end tip and the inflatable flotation device during extension of the aspirator barrel.

In any of the foregoing embodiments, the aspirator further includes a cap designed to be disposed on the end tip of the aspirator barrel, to prevent at least one of the gas or the fluid from flowing into the inflatable flotation device during at least a portion of extension of the aspirator barrel within the inflatable flotation device, and to allow at least one of the gas or the fluid to flow into the inflatable flotation device response to pressure within the aspirator barrel reaching a predetermined pressure.

In any of the foregoing embodiments, the cap includes at least one of a burst disk designed to rupture in response to the pressure within the aspirator barrel reaching the predetermined pressure, or a snap-fit feature designed to release from the end tip in response to the pressure within the aspirator barrel reaching the predetermined pressure.

In any of the foregoing embodiments, the aspirator further includes an adhesive attaching the cap to the end tip and designed to allow the cap to detach from the end tip in response to the pressure within the aspirator barrel reaching the predetermined pressure.

In any of the foregoing embodiments, the predetermined pressure is selected such that the aspirator barrel is in a fully extended position in response to the pressure within the aspirator barrel being the predetermined pressure.

In any of the foregoing embodiments, the compressible spring of the aspirator barrel includes at least one of aluminum, an aluminum alloy, or steel and the fabric of the aspirator barrel includes at least one of a neoprene, a urethane, an aramid fiber, or a para-aramid fiber.

Also described is an aircraft having an evacuation system. The aircraft includes a fuselage, an inflatable flotation device removably coupled to the fuselage and designed to float in response to being inflated, and a compressed fluid source coupled to the inflatable flotation device and designed to store a fluid in a compressed state. The aircraft also includes an aspirator coupled to the inflatable flotation device. The aspirator includes an aspirator body having at least one flapper door designed to allow intake of a gas from an environment of the aspirator. The aspirator also includes an aspirator barrel coupled to the aspirator body and the inflatable flotation device, having an end tip, a compressible spring, and a fabric positioned about the compressible spring, and designed to extend in response to receiving the gas and to transfer the gas from the aspirator body to the inflatable flotation device. The aspirator also includes a gas valve coupled to the aspirator body and designed to receive the fluid from the compressed fluid source. The aspirator also includes a nozzle positioned within the aspirator body, coupled to the gas valve, and designed to receive the fluid via the gas valve and to direct at least a portion of the fluid towards the aspirator barrel such that the at least one flapper door allows the gas to flow from the environment into the aspirator barrel.

In any of the foregoing embodiments, the end tip of the aspirator barrel has a glass coating to reduce friction between the end tip and the inflatable flotation device during extension of the aspirator barrel.

In any of the foregoing embodiments, the aspirator further includes a cap designed to be disposed on the end tip of the aspirator barrel, to prevent at least one of the gas or the fluid from flowing into the inflatable flotation device during at least a portion of extension of the aspirator barrel within the inflatable flotation device, and to allow at least one of the gas or the fluid to flow into the inflatable flotation device response to pressure within the aspirator barrel reaching a predetermined pressure.

In any of the foregoing embodiments, the cap includes at least one of a burst disk designed to rupture in response to the pressure within the aspirator barrel reaching the predetermined pressure, or a snap-fit feature designed to release from the end tip in response to the pressure within the aspirator barrel reaching the predetermined pressure.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
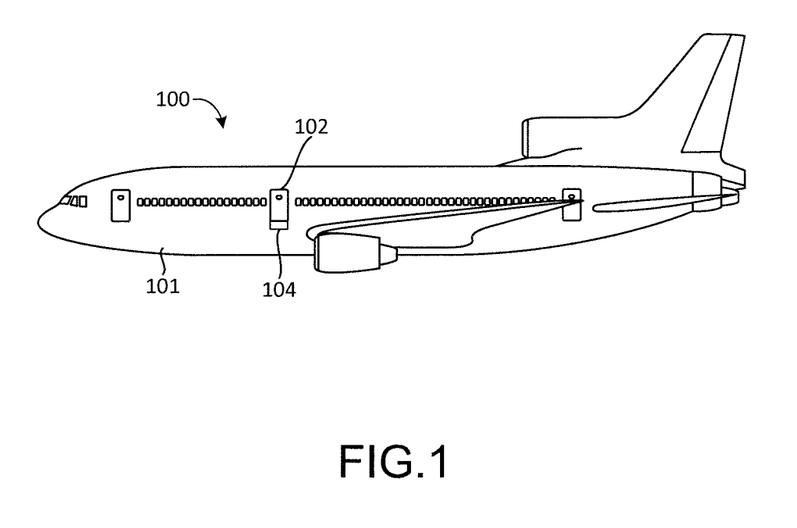
FIG. 1 is a drawing of an aircraft having an exit door and an evacuation system, in accordance with various embodiments.

Referring now to FIG. 1, an aircraft 100 is shown. The aircraft 100 may include a fuselage 101 having plurality of exit doors including an exit door 102. The aircraft 100 may include one or more evacuation systems positioned near a corresponding exit door. For example, the aircraft 100 includes an evacuation system 104 positioned near the exit door 102. The evacuation system 104 may be removably coupled to the fuselage 101. In the event of an emergency, the exit door 102 may be opened by a passenger or crew member of the aircraft 100. In various embodiments, the evacuation system 104 may deploy in response to the exit door 102 being opened and, in various embodiments, the evacuation system 104 may deploy in response to another action taken by a passenger or crew member such as depression of a button or actuation of a lever.

Figure 2:
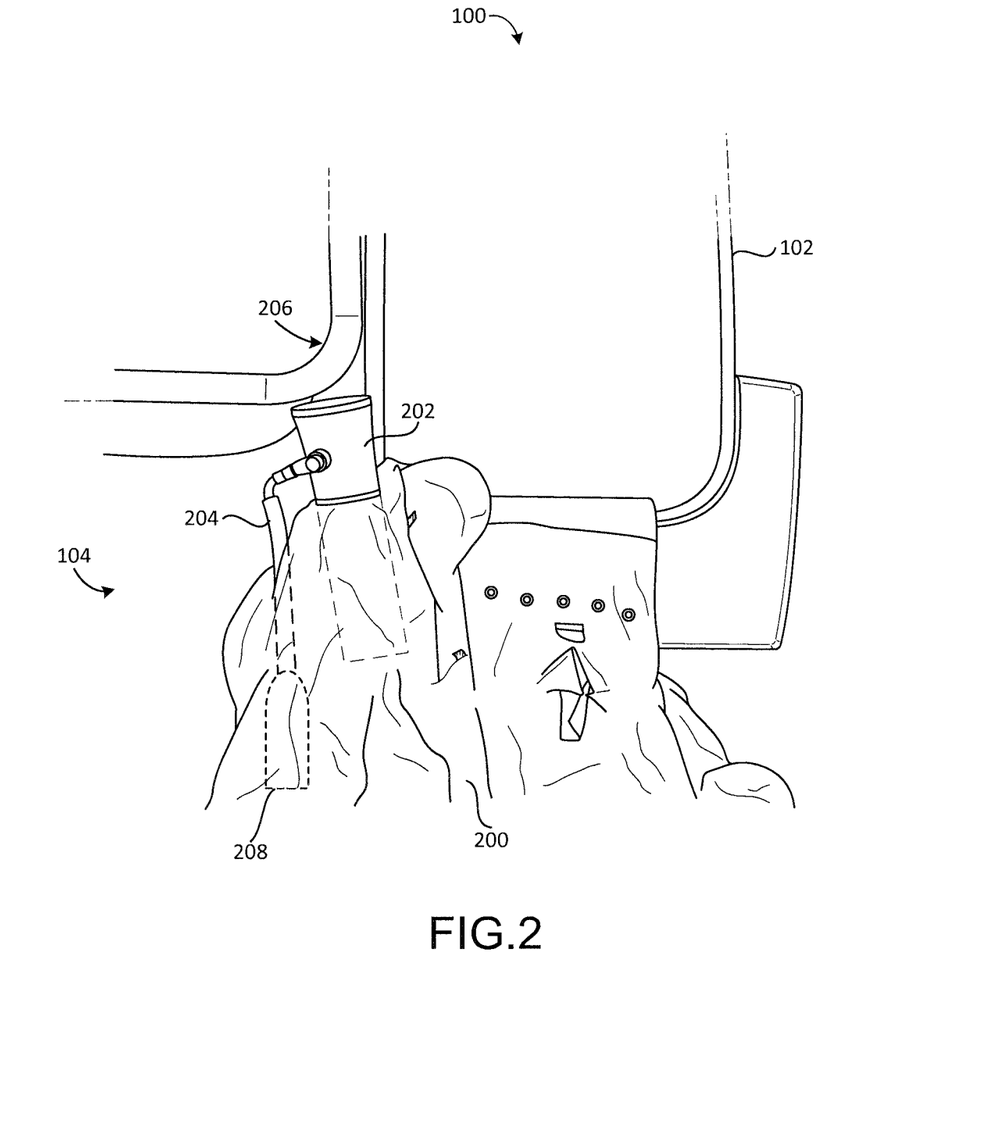
FIG. 2 is a drawing of the evacuation system of FIG. 1 including an aspirator, in accordance with various embodiments.

Turning to FIG. 2, additional details of the evacuation system 104 are illustrated. In particular, the evacuation system 104 includes an inflatable flotation device 200. The evacuation system 104 further includes a source of forced gas 206. The source of forced gas 206 may cause a gas to enter the inflatable flotation device 200 to inflate the inflatable flotation device 200. The inflatable flotation device 200 may be coupled to the fuselage 101 of FIG. 1, and may be decoupled from the fuselage 101 in response to being fully inflated or manually detached to allow passengers and/or crew members to safely float away from the aircraft 100 of FIG. 1.

The source of forced gas 206 may include an aspirator 202 coupled to the inflatable flotation device 200, piping 204 coupled to the aspirator 202, and a compressed fluid source 208 coupled to the piping 204. Under normal operating conditions, the inflatable flotation device 200 may be deflated and stored within a compartment of the aircraft 100. In various embodiments, the inflatable flotation device 200 and the aspirator 202 may be stored in a single package within the aircraft compartment. In response to deployment of the evacuation system 104, fluid may flow into the aspirator 202 via the piping 204 at a relatively high velocity. This fluid flow may cause the aspirator 202 to draw gas from the environment. The fluid flow (such as in a gaseous state) and the environmental gas may be directed into the inflatable flotation device 200. In response to receiving the fluid flow and the environmental gas, the inflatable flotation device 200 may begin to inflate.

Figure 3:
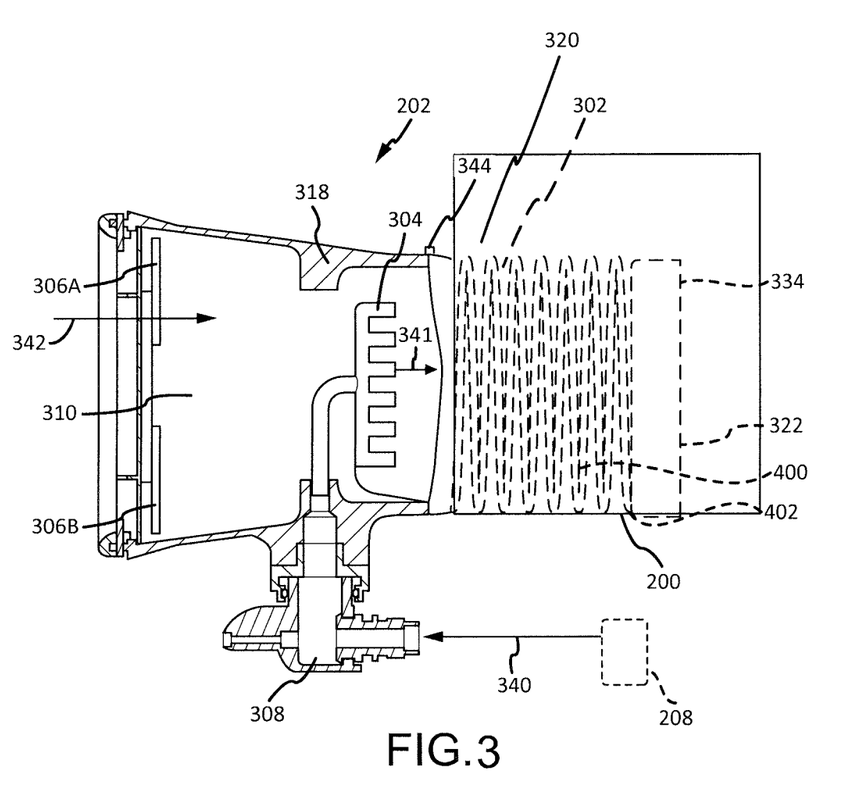
FIG. 3 is a drawing of the aspirator of FIG. 2 illustrating features of the aspirator, in accordance with various embodiments.

Turning now to FIG. 3, additional details of the aspirator 202 are shown. The aspirator 202 includes an aspirator body 318, whose cross section is shown, connected to an aspirator barrel 302.

The aspirator body 318 may be formed from a rigid material such as aluminum, steel, carbon fiber composite material, a nano-composite material, or another rigid composite material such as polytetrafluoroethylene (PTFE) (available under the trademark TEFLON).

Figure 4:
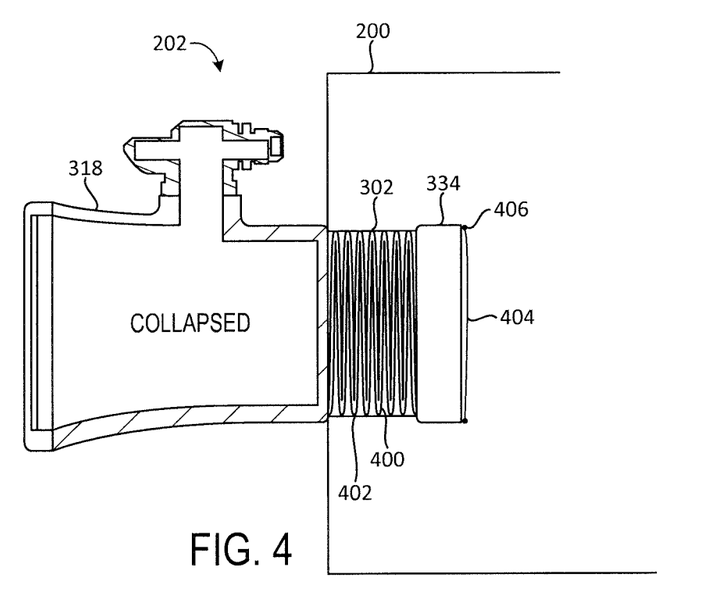
FIG. 4 is a drawing of the aspirator of FIG. 2 in a compressed state, in accordance with various embodiments.
Figure 5:
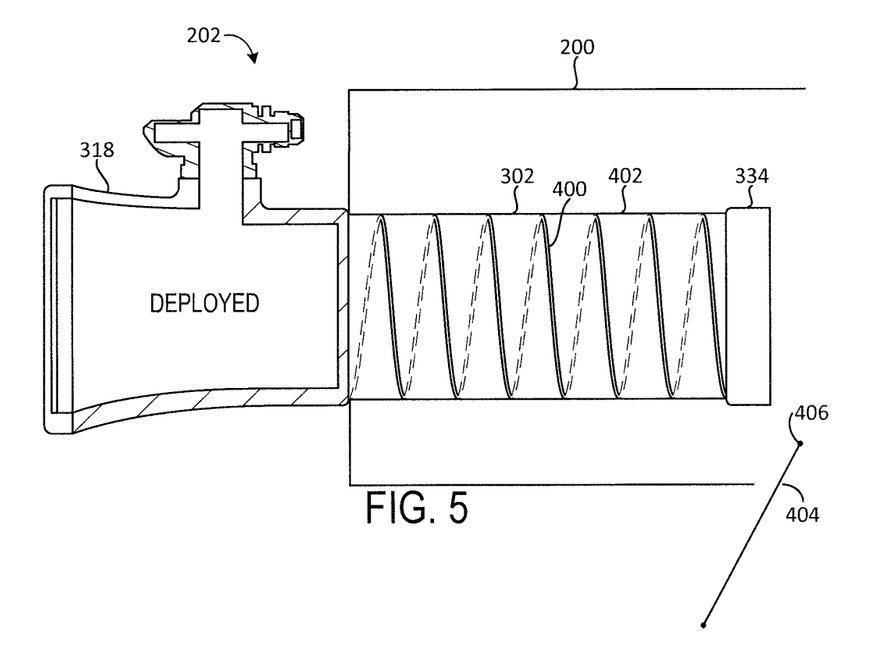
FIG. 5 is a drawing of the aspirator of FIG. 2 in a fully extended state, in accordance with various embodiments.

The aspirator barrel 302 is capable of being in a compressed state (as shown in FIG. 4) and also capable of being in a fully extended position or state (as shown in FIG. 5). The aspirator barrel 302 may comprise a compressible spring 400 and a fabric 402 that is relatively flexible. The aspirator barrel 302 may also include an end tip 334 that is designed to extend farther in the inflatable flotation device 200 than the remainder of the aspirator barrel 302.

In various embodiments, the fabric 402 may include the same material as is used in the inflatable flotation device 200. In various embodiments, the flexible fabric has a relatively high tensile strength and is made of, for example, a neoprene, a urethane, an aramid fiber, and/or a para-aramid fiber.

In various embodiments, the compressible spring 400 may be relatively flexible and have a relatively high yield strength. In various embodiments, the compressible spring 400 may include at least one of aluminum, an aluminum alloy, or steel.

In various embodiments, the end tip 334 may be formed from a rigid material such as aluminum, steel, carbon fiber composite material, a nano-composite material, or another rigid composite material such as PTFE. In various embodiments, the end tip 334 may be formed from the same material as the aspirator body 318. In various embodiments, it is desirable for the end tip 334 to have a relatively low coefficient of friction in order to reduce friction between the end tip 334 and an inner surface of the inflatable flotation device 200. A reduction in friction between these two components reduces the likelihood of damage to the inflatable flotation device 200 during extension of the aspirator barrel 302 and during inflation of the inflatable flotation device 200. In that regard, the end tip 334 may be coated with a material having a relatively low coefficient of friction such as a glass or PTFE.

Due to the compressibility of the compressible spring 400 and the flexibility of the fabric 402, the aspirator barrel 302 may be compacted prior to being packaged with the inflatable flotation device 200. This advantageously results in the aspirator 202 filling less space within the packaging.

The aspirator body 318 may also include a nozzle 304 (such as a showerhead nozzle or manifold), at least one flapper door (such as a first flapper door 306A and a second flapper door 306B), and a gas valve 308. The nozzle 304 may be coupled to the gas valve 308. The gas valve 308 may direct a fluid from the compressed fluid source 208, such as a charged cylinder, through the nozzle 304 and into an aspirator chamber 310. The aspirator chamber 310 is defined by the aspirator body 318. The aspirator body 318 may include the rigid material in order to protect the gas valve 308, the nozzle 304, and the flapper doors 306A, 306B, as well as ensuring the aspirator chamber 310 is defined.

In response to high-pressure gas moving from the compressed fluid source 208 to the aspirator chamber 310 via the gas valve 308 (as shown by an arrow 340) and flowing through the nozzle 304 (as shown by an arrow 341), gas from the environment of the aspirator 202 is compelled into the aspirator chamber 310 from outside the aspirator 202 (as shown by an arrow 342) due to the Venturi effect. Stated differently, the aspirator 202 facilitates intake of gas from the environment. The gas enters the aspirator chamber 310 through the flapper doors 306A, 306B.

The flapper doors 306A, 306B are designed to open inward to allow compelled gas to enter the aspirator chamber 310. The flapper doors 306A, 306B are also designed to keep the atmospheric gas from exiting the aspirator chamber 310 via the flapper doors 306A, 306B by functioning as a one-way valve. As shown in FIG. 3, the flapper doors 306A, 306B are in a closed configuration, as high-pressure gas is not being provided to the aspirator chamber 310 via the gas valve 308 and the nozzle 304.

The aspirator barrel 302 may include a first end 320 coupled to the aspirator body 318 and a second end 322 (on which the end tip 334 is positioned) that extends into the inflatable flotation device 200. The aspirator barrel 302 may be connected to the aspirator body 318 by wrapping a band clamp 344 around a flange connection between the aspirator body 318 and the aspirator barrel 302.

Turning now to FIG. 4, the aspirator 202 is shown with the aspirator barrel 302 in the compressed state. In various embodiments, the aspirator 202 may be packaged with the inflatable flotation device 200 while in the compressed state.

As shown, at least a portion of the aspirator barrel 302 is positioned within the inflatable flotation device 200. Thus, as shown in FIG. 5, in response to extension of the aspirator barrel 302, at least a portion of the aspirator barrel 302 extends within the inflatable flotation device 200. It is desirable for at least a portion of the aspirator barrel 302 to extend within the inflatable flotation device 200 to increase the likelihood of a relatively constant inflation rate of the inflatable flotation device 200. Thus, it is also desirable for the aspirator barrel 302 to become at least partially extended prior to inflation of the inflatable flotation device 200.

In that regard, the end tip 334 may include a cap 404 to facilitate extension of the aspirator barrel 302 within the inflatable flotation device 200. The cap 404 may include any flexible or inflexible material that nearly prevents or substantially reduces a flow of gas therethrough. For example, the cap may include a plastic, a rubber, or a composite material.

Referring now to FIGS. 2, 4, and 5, the inflatable flotation device 200 may be folded prior to storage. The inflatable flotation device 200 may unfold in response to deployment of the evacuation system 104. In response to the inflatable flotation device 200 unfolding, the compressible spring 400 may begin to extend, at least partially elongating the aspirator barrel 302 within the inflatable flotation device 200. However, due to a relative lack of volume within the deflated inflatable flotation device 200, and due to friction, the force of the compressible spring 400 may not be sufficient to force the aspirator barrel 302 into the fully extended position.

The cap 404 may cover an aperture of the end tip 334 and may be bonded to the end tip 334 via an adhesive 406. In response to gas flowing through the aspirator body 318 into the aspirator barrel 302 upon deployment of the evacuation system 104, the adhesive 406 causes the cap 404 to remain on the end tip 334. While the cap 404 is coupled to the end tip 334, the cap 404 prevents the gas from flowing into the inflatable flotation device 200. Thus, pressure builds within the aspirator barrel 302, causing the aspirator barrel 302 to extend.

The adhesive 406 may be designed to cause the cap 404 to remain coupled to the end tip 334 until pressure within the aspirator barrel 302 reaches a predetermined pressure. Stated differently, adhesive 406 may release the cap 404 from the end tip 334 in response to pressure within the aspirator barrel 302 reaching the predetermined pressure.

The predetermined pressure may correspond to a pressure at which the aspirator barrel 302 is in a partially or fully extended state. Stated differently, the pressure within the aspirator barrel 302 may reach the predetermined pressure in response to the aspirator barrel 302 reaching the fully extended state. Thus, the cap 404 may become removed from the end tip 334 in response to the aspirator barrel 302 reaching the fully extended state, as shown in FIG. 5. Accordingly, in response to the aspirator barrel 302 reaching the fully extended state and the cap detaching from the end tip 334, gas may flow through the aspirator barrel 302 into the inflatable flotation device 200. In various embodiments, the predetermined pressure may be between 10 pounds per square inch (PSI, 68.9 Kilopascal (kPa)) and 350 PSI (276 kPa), between 15 PSI (103 kPa) and 300 PSI (207 kPa), or between 20 PSI (138 kPa) and 200 PSI (276 kPa). In various embodiments, the predetermined pressure may be relatively high in order to withstand an initial impact pressure of fluid output by the aspirator body 318.

Figure 6:
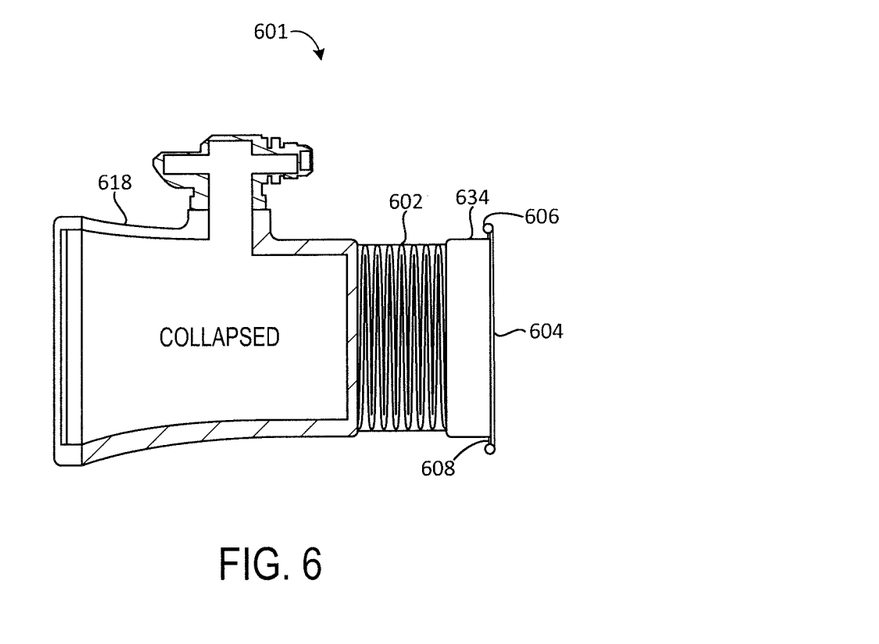
FIG. 6 is a drawing of an aspirator in a compressed state, in accordance with various embodiments.
Figure 7:
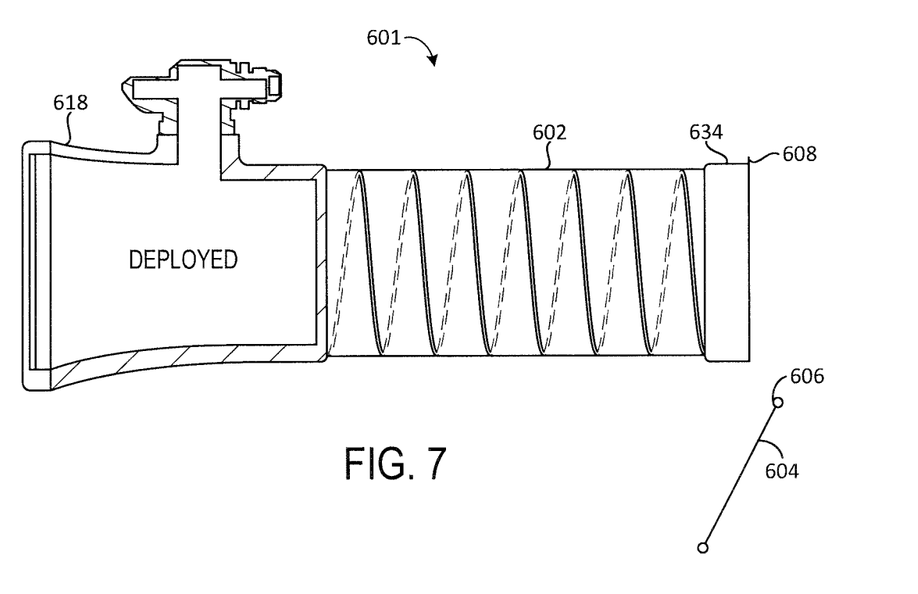
FIG. 7 is a drawing of the aspirator of FIG. 6 in a fully extended state, in accordance with various embodiments.

Referring now to FIGS. 6 and 7, another aspirator 601 may have a compressed state (as shown in FIG. 6) and a fully extended state (as shown in FIG. 7). The aspirator 601 may have similar features as the aspirator 202 of FIG. 4. In particular, the aspirator 601 includes an aspirator barrel 602 having an end tip 634 and an aspirator body 618. The aspirator barrel 602 may include a compressible spring and fabric, similar to the aspirator barrel 302 of FIG. 3. Unlike the aspirator 202 of FIG. 4, the aspirator 601 may include a cap 604 that attaches to the end tip 634 via a snap-fit feature 606.

The end tip 634 may include a flange 608 that extends outward from the end tip 634. The snap-fit feature 606 may include a lip. The snap-fit feature 606 (such as the lip) may be positioned about the flange 608. The cap may be retained in place relative to the end tip 634 in response to the snap-fit feature 606 being positioned about the flange. Thus, in response to gas flowing into the aspirator barrel 602 via the aspirator body 618, the gas may build pressure within the aspirator barrel 602 causing the aspirator barrel 602 to extend. Any other snap fit feature may be included with at least one of the end tip 634 or the cap 604.

The snap-fit feature 606 may be designed to release from the flange 608 in response to pressure within the aspirator barrel 602 reaching a predetermined pressure. The predetermined pressure may correspond to a pressure at which the aspirator barrel 602 is in a partially or fully extended state. Thus, the cap 604 may separate from the end tip 634 in response to the pressure within the aspirator barrel 602 reaching the predetermined pressure. Accordingly, air may flow through the aspirator barrel 602 via the aspirator body 618 in response to the aspirator barrel 602 becoming fully extended.

Figure 8:
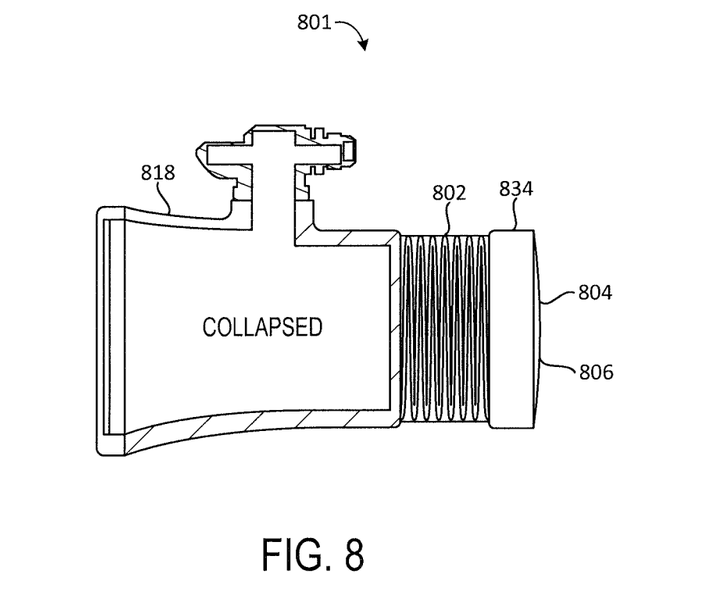
FIG. 8 is a drawing of an aspirator in a compressed state, in accordance with various embodiments.
Figure 9:
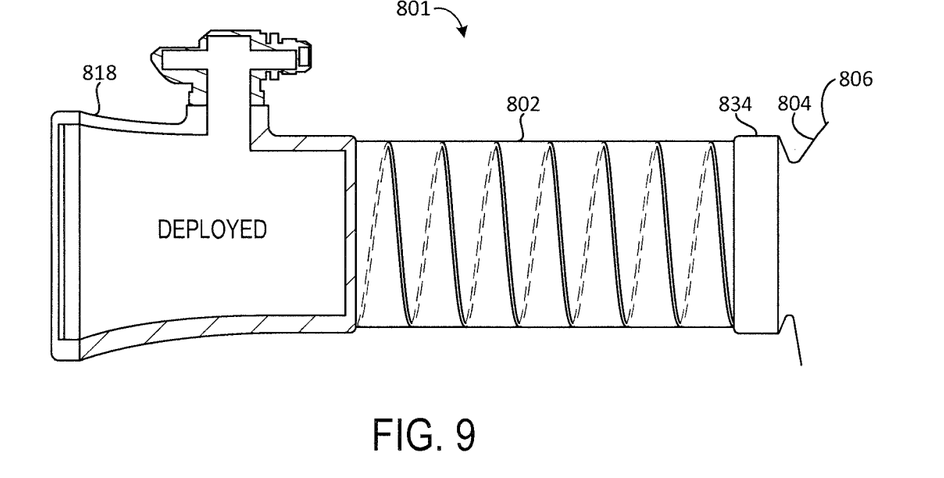
FIG. 9 is a drawing of the aspirator of FIG. 8 in a fully extended state, in accordance with various embodiments.

Referring now to FIGS. 8 and 9, another aspirator 801 may have a compressed state (as shown in FIG. 8) and a fully extended state (as shown in FIG. 9). The aspirator 801 may have similar features as the aspirator 202 of FIG. 4. In particular, the aspirator 801 includes an aspirator barrel 802 having an end tip 834 and an aspirator body 818. The aspirator barrel 802 may include a compressible spring and fabric, similar to the aspirator barrel 302 of FIG. 3. Unlike the aspirator 202 of FIG. 4, the aspirator 801 may include a cap 604 that functions as a burst disk 806.

The burst disk 806 may be coupled to the end tip 834 via an adhesive or other attachment means. Unlike the cap 404 of FIG. 4 and the cap 604 of FIG. 6, the burst disk 806 may not release from the end tip 834 in response to pressure within the aspirator barrel 802 reaching a predetermined pressure.

The burst disk 806 may be designed to rupture in response to pressure within the aspirator barrel 802 reaching the predetermined pressure. The predetermined pressure may correspond to a pressure at which the aspirator barrel 802 is in a partially or fully extended state. Thus, the burst disk 806 may rupture in response to the pressure within the aspirator barrel 802 reaching the predetermined pressure. Accordingly, air may flow through the aspirator barrel 802 via the aspirator body 818 in response to the aspirator barrel 802 becoming fully extended.

The burst disk 806 may include any material capable of bursting in response to a predetermined amount of pressure. For example, the burst disk 806 may include a plastic, a rubber, or another material. The burst disk 806 may be relatively thin. The thickness and the material of the burst disk 806 may be selected such that the burst disk 806 will rupture in response to the pressure within the aspirator barrel 802 reaching the predetermined pressure. In various embodiments, the burst disk 806 may be scored in one or more location to facilitate rupturing in response to the pressure within the aspirator barrel 802 reaching the predetermined pressure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for inflating an inflatable flotation device, comprising:
   the inflatable flotation device;
   an aspirator body having at least one flapper door configured to allow intake of a gas from an environment of the aspirator;
   an aspirator barrel coupled to the aspirator body and the inflatable flotation device, having an end tip, a compressible spring, and a fabric positioned about the compressible spring, and configured to extend in response to receiving the gas and to transfer the gas from the aspirator body to the inflatable flotation device;
   a gas valve coupled to the aspirator body and configured to receive a fluid from a compressed fluid source; and
   a nozzle positioned within the aspirator body, coupled to the gas valve, and configured to receive the fluid via the gas valve and to direct at least a portion of the fluid towards the aspirator barrel such that the at least one flapper door allows the gas to flow from the environment into the aspirator barrel,
   wherein the end tip of the aspirator barrel is formed from a rigid material and has a glass coating to reduce friction between the end tip and the inflatable flotation device during extension of the aspirator barrel,
   wherein the inflatable flotation device is folded in response to being stowed such that the folding resists extension of the compressible spring, and
   wherein the compressible spring is configured to extend to cause the aspirator barrel to extend within the inflatable flotation device in response to an unfolding of the inflatable flotation device.

2. The system of claim 1 wherein the aspirator is configured to be used with an evacuation system of an aircraft.

3. The system of claim 1 wherein the compressible spring of the aspirator barrel includes at least one of aluminum, an aluminum alloy, or steel and the fabric of the aspirator barrel includes at least one of a neoprene, a urethane, an aramid fiber, or a para-aramid fiber.

4. The system of claim 1 further comprising a cap configured to:
   be disposed on the end tip of the aspirator barrel;
   prevent at least one of the gas or the fluid from flowing into the inflatable flotation device during at least a portion of extension of the aspirator barrel within the inflatable flotation device; and
   allow at least one of the gas or the fluid to flow into the inflatable flotation device response to pressure within the aspirator barrel reaching a predetermined pressure.

5. The system of claim 4 wherein the cap includes a burst disk configured to rupture in response to the pressure within the aspirator barrel reaching the predetermined pressure.

6. The system of claim 4 wherein the cap includes a snap-fit feature configured to release from the end tip in response to the pressure within the aspirator barrel reaching the predetermined pressure.

7. The system of claim 4 further comprising an adhesive attaching the cap to the end tip and configured to allow the cap to detach from the end tip in response to the pressure within the aspirator barrel reaching the predetermined pressure.

8. The system of claim 4 wherein the predetermined pressure is selected such that the aspirator barrel is in a fully extended position in response to the pressure within the aspirator barrel being the predetermined pressure.

9. An evacuation system for use with an aircraft, comprising:
   an inflatable flotation device configured to float in response to being inflated;
   a compressed fluid source configured to store a fluid in a compressed state; and
   an aspirator having:
      an aspirator body having at least one flapper door configured to allow intake of a gas from an environment of the aspirator;
      an aspirator barrel coupled to the aspirator body and the inflatable flotation device, having an end tip, a compressible spring, and a fabric positioned about the compressible spring, and configured to extend in response to receiving the gas and to transfer the gas from the aspirator body to the inflatable flotation device;
      a gas valve coupled to the aspirator body and configured to receive the fluid from the compressed fluid source; and
      a nozzle positioned within the aspirator body, coupled to the gas valve, and configured to receive the fluid via the gas valve and to direct at least a portion of the fluid towards the aspirator barrel such that the at least one flapper door allows the gas to flow from the environment into the aspirator barrel,
   wherein the end tip of the aspirator barrel is formed from a rigid material and has a glass coating to reduce friction between the end tip and the inflatable flotation device during extension of the aspirator barrel,
   wherein the inflatable flotation device is folded in response to being stowed such that the folding resists extension of the compressible spring, and wherein the compressible spring is configured to extend to cause the aspirator barrel to extend within the inflatable flotation device in response to an unfolding of the inflatable flotation device.

10. The evacuation system of claim 9 wherein the aspirator further includes a cap configured to:
be disposed on the end tip of the aspirator barrel;
prevent at least one of the gas or the fluid from flowing into the inflatable flotation device during at least a portion of extension of the aspirator barrel within the inflatable flotation device; and
allow at least one of the gas or the fluid to flow into the inflatable flotation device response to pressure within the aspirator barrel reaching a predetermined pressure.

11. The evacuation system of claim 10 wherein the cap includes at least one of:
a burst disk configured to rupture in response to the pressure within the aspirator barrel reaching the predetermined pressure; or
a snap-fit feature configured to release from the end tip in response to the pressure within the aspirator barrel reaching the predetermined pressure.

12. The evacuation system of claim 10 wherein the aspirator further includes an adhesive attaching the cap to the end tip and configured to allow the cap to detach from the end tip in response to the pressure within the aspirator barrel reaching the predetermined pressure.

13. The evacuation system of claim 10 wherein the predetermined pressure is selected such that the aspirator barrel is in a fully extended position in response to the pressure within the aspirator barrel being the predetermined pressure.

14. The evacuation system of claim 9 wherein the compressible spring of the aspirator barrel includes at least one of aluminum, an aluminum alloy, or steel and the fabric of the aspirator barrel includes at least one of a neoprene, a urethane, an aramid fiber, or a para-aramid fiber.

15. An aircraft having an evacuation system, the aircraft comprising:
a fuselage;
an inflatable flotation device removably coupled to the fuselage and configured to float in response to being inflated;
a compressed fluid source coupled to the inflatable flotation device and configured to store a fluid in a compressed state; and
an aspirator coupled to the inflatable flotation device and having:
an aspirator body having at least one flapper door configured to allow intake of a gas from an environment of the aspirator;
an aspirator barrel coupled to the aspirator body and the inflatable flotation device, having an end tip, a compressible spring, and a fabric positioned about the compressible spring, and configured to extend in response to receiving the gas and to transfer the gas from the aspirator body to the inflatable flotation device;
a gas valve coupled to the aspirator body and configured to receive the fluid from the compressed fluid source; and
a nozzle positioned within the aspirator body, coupled to the gas valve, and configured to receive the fluid via the gas valve and to direct at least a portion of the fluid towards the aspirator barrel such that the at least one flapper door allows the gas to flow from the environment into the aspirator barrel,
wherein the end tip of the aspirator barrel is formed from a rigid material and has a glass coating to reduce friction between the end tip and the inflatable flotation device during extension of the aspirator barrel,
wherein the inflatable flotation device is folded in response to being stowed such that the folding resists extension of the compressible spring, and
wherein the compressible spring is configured to extend to cause the aspirator barrel to extend within the inflatable flotation device in response to an unfolding of the inflatable flotation device.

16. The aircraft of claim 15 wherein the aspirator further includes a cap configured to:
be disposed on the end tip of the aspirator barrel;
prevent at least one of the gas or the fluid from flowing into the inflatable flotation device during at least a portion of extension of the aspirator barrel within the inflatable flotation device; and
allow at least one of the gas or the fluid to flow into the inflatable flotation device response to pressure within the aspirator barrel reaching a predetermined pressure.

17. The aircraft of claim 16 wherein the cap includes at least one of:
a burst disk configured to rupture in response to the pressure within the aspirator barrel reaching the predetermined pressure; or
a snap-fit feature configured to release from the end tip in response to the pressure within the aspirator barrel reaching the predetermined pressure.

* * * * *